United States Patent [19]

Shelton

[11] Patent Number: 5,426,861
[45] Date of Patent: Jun. 27, 1995

[54] METHOD AND APPARATUS FOR INSPECTING PARTS FOR DIMENSIONAL ACCURACY OUTSIDE A LABORATORY ENVIRONMENT

[75] Inventor: Russell S. Shelton, Flanders, N.J.

[73] Assignee: Advanced Metrological Development, Flanders, N.J.

[21] Appl. No.: 47,414

[22] Filed: Apr. 19, 1993

[51] Int. Cl.$^6$ .............................................. G01B 5/03
[52] U.S. Cl. ...................................... 33/502; 33/503; 33/545
[58] Field of Search ................... 33/502, 503, 504, 702, 33/703, 704, 545, 548; 73/15; 364/571.03, 571.05

[56] References Cited

U.S. PATENT DOCUMENTS 5,257,460  11/1993  McMurtry ............................ 33/502

FOREIGN PATENT DOCUMENTS 3620118  12/1987  Germany .............................. 33/702
1670331   8/1991  U.S.S.R. .............................. 33/503
8802096   3/1988  WIPO ................................... 33/702

Primary Examiner—Alvin Wirthlin
Attorney, Agent, or Firm—Beveridge, DeGrandi, Weilacher & Young

[57] ABSTRACT

Accurate measurements of production parts are obtained from a system which includes a first measuring apparatus in a laboratory, and a second measuring apparatus which is in a non-laboratory environment where it is subjected to greater temperature fluctuations than in the laboratory. A reference part of substantially the same size and shape as the production parts is inspected by both measuring apparatuses, and the production part is inspected by the second measuring apparatus. While being inspected, both parts occupy substantially the same location on the second measuring apparatus. Results of these inspections are processed by a computer to provide (1) target values which the shop machine would perceive when inspecting a perfect part as specified by the part drawings, or (2) values which indicate what the laboratory machine would perceive for the production part.

27 Claims, 1 Drawing Sheet

FIG. 1A
PERFECT PART
FIG. 1B
REFERENCE PART
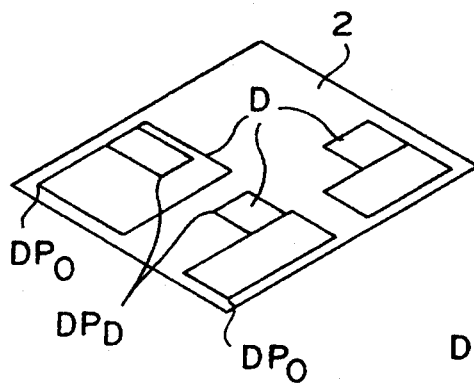
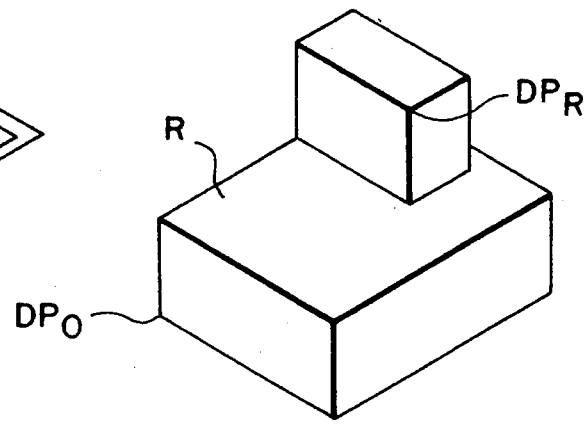
FIG. 2
LABORATORY MACHINE
FIG. 1C
PRODUCTION PART
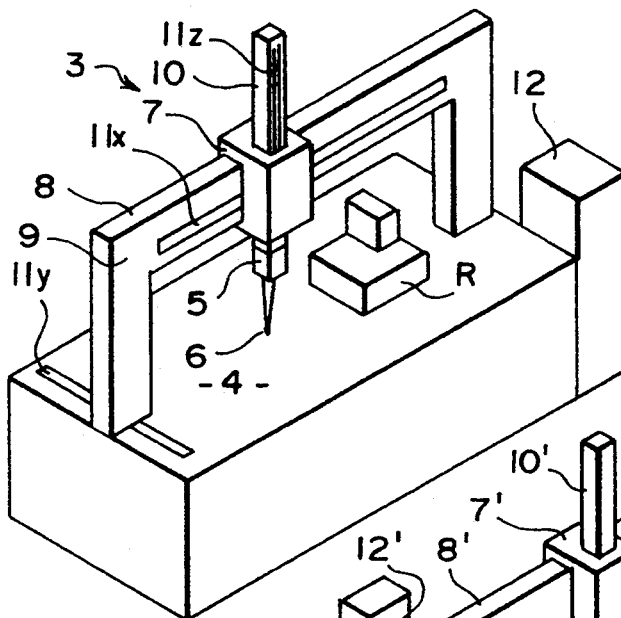
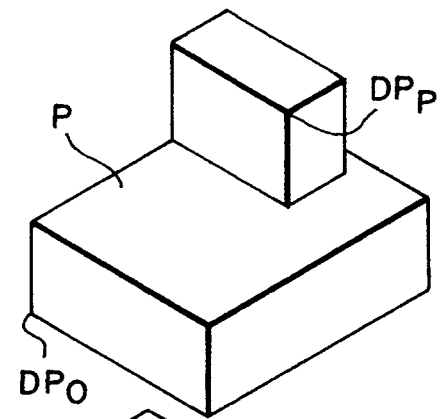
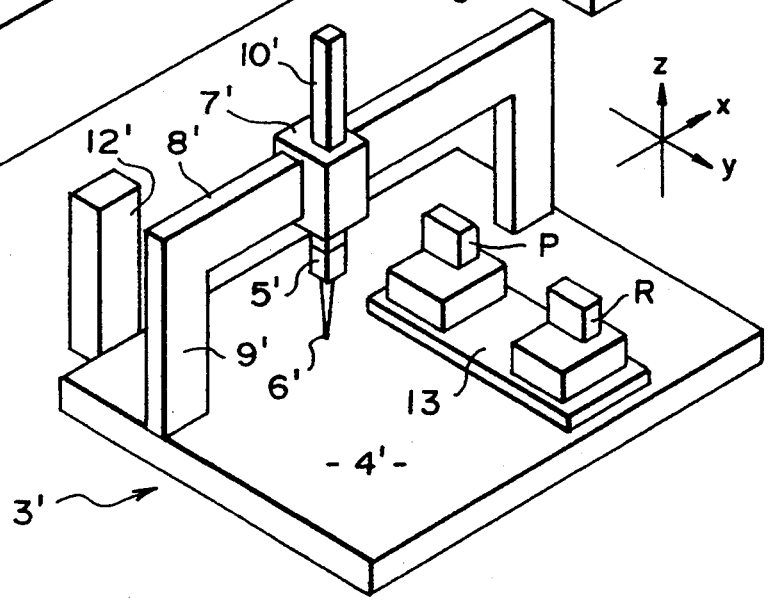
FIG. 3
SHOP MACHINE

METHOD AND APPARATUS FOR INSPECTING PARTS FOR DIMENSIONAL ACCURACY OUTSIDE A LABORATORY ENVIRONMENT

BACKGROUND OF THE INVENTION

This invention relates to the dimensional inspection of parts.

The inspection of manufactured parts for dimensional accuracy is often performed by coordinate measuring machines. Such machines typically have a workpiece support and a traveling bridge which supports a workpiece-contacting probe. The probe is movable along three mutually perpendicular axes, and position sensing devices are utilized to determine the locations of the probe when it is in contact with the surface of the workpiece in terms of x, y, and z axes. These locations are recorded and they provide the basis for calculations which indicate the dimensions of the workpiece.

Measuring machines are customarily calibrated by using gauge blocks of known dimensions. The gauge block is inspected by the machine being calibrated and the inspection results are compared to the known dimensions of the gauge block. Subsequent measurements from the calibrated machine are adjusted accordingly.

Such calibrations are based on the assumptions that the dimensions of a gauge block do not change, and that the errors in a measuring machine are relatively uniform from one point to another throughout the measuring volume. The first of these assumptions is false if the temperature of the gauge block is different from the temperatures at which it was initially gaged, as will usually be the situation on a shop floor where there is no precise temperature control. The second assumption is false because a measuring machine, due to its individual vagaries, will produce errors with magnitudes which vary from one point to another throughout the measuring volume.

In the metrology field, it is generally accepted that a coordinate measuring machine must be located in a controlled environment in order to provide accurate measurements. Specially designed measuring laboratories are often constructed so that temperature, air purity, humidity, and other environmental elements are closely controlled to avoid conditions which would adversely affect the accuracy of any measurements.

Under current industrial practices, tolerances are stricter than they were in the past, and inventories are minimized due to just-in-time inventory practices. In view of these situations, there is a recognized need to place measuring machines on the shop floor. This would permit inspection of the parts soon after they are manufactured, and the manufacturing conditions can be adjusted quickly when necessary in order to improve the dimensional accuracy of subsequently manufactured parts. Heretofore, efforts to provide accurate measurements on the shop floor have focused on increasing the durability and accuracy of such machines in ways which attempt to overcome environmental problems.

As a practical matter, measuring laboratories cannot be located at workstations throughout a factory. A measuring machine in an uncontrolled environment cannot provide measurements which are dimensionally accurate. The sizes and shapes of parts being inspected change in various ways, and the measuring machine itself also changes. Thus, measuring machines remain in the laboratories, and production parts must travel from the shop to the measuring laboratory. This requires extra handling of the parts and inherent delays in detecting problems when they arise.

The present invention, aptly called "comparative metrology," makes it possible to obtain accurate measurements from measuring machines located throughout a factory or elsewhere outside an environmentally controlled measuring laboratory.

This invention is untraditional in the respect that it accepts and tolerates the fact that raw dimensional measurements made on the shop floor will be inaccurate. The invention relies on the fact that, despite their inaccuracies, such measurements taken on the shop floor are repeatable within an acceptable range of variations.

The rationale behind the present invention is that it is impossible to compensate for everything which may create measurement errors. Rather than trying to overcome environmental problems by modifying the machine or controlling the environment, a reference part of substantially the same size and shape as the eventual production part is inspected in the laboratory so that its dimensions are known as precisely as is possible in the laboratory. This reference part is then taken to another measuring machine which is on the shop floor where there is a less controlled environment to which the reference part and the production parts are exposed. The reference part is inspected by the shop floor machine and a production part is inspected by the shop floor machine. The measurement data is processed to determine, with accuracy comparable to laboratory accuracy, how close the dimensions of the production part are to the specified dimensions.

SUMMARY OF THE INVENTION

In one respect, the invention is a method for determining the difference between a measured value $v_P$ of a location of an actual data point on a production part and a nominal value $v_D$ of a desired location of the data point on a perfect part. According to this method, a first measuring apparatus at a first site is used to obtain a value $v_{RL}$ for the location of a data point $DP_R$ on the reference part. A second measuring apparatus at a second site is used to obtain a second value $v_{RS}$ of the location of the data point $DP_R$ on the reference part. Temperature fluctuations are greater at the second site than at the first site. The production part is inspected by the second measuring apparatus at a data point $DP_P$ which corresponds to the data point on the reference part to obtain a value $v_P$ of the location of the actual data point on the production part. The difference between $v_{RL}$ and $v_{RS}$ is then added to one of $v_D$ and $v_{PS}$ to obtain a given value, and this given value is compared to the other of $v_D$ and $v_{PS}$ to determine the extent to which the production part deviates from a perfect part.

The difference between $v_{RL}$ and $v_{RS}$ can be added to $v_D$ to obtain a value which is compared to $v_{PS}$ to determine the extent to which the production part deviates from a perfect part. Alternatively, the difference between $v_{RL}$ and $v_{RS}$ can be added to $v_{PS}$ to obtain a value which is compared to $v_D$ to determine the extent to which the production part deviates from a perfect part. The invention also pertains to apparatus for determining the difference between a measured value $v_P$ of a location of an actual data point on a production part and a nominal value $v_D$ of the desired location of the data point on a perfect part. At a first site, there is a first measuring means for finding a value $v_{RL}$ which expresses a location of an actual data point on the reference part. At a second site where temperature fluctuations are greater than at the first site, there is a second measuring machine with means for determining (a) a second value $v_{RS}$ expressing a location of the actual data point on the reference part, and (b) a value vP of the location of the actual data point on the production part. The apparatus also has a computer or other calculation means for adding the difference between $v_{RL}$ and $v_{RS}$ to one of $v_D$ and $v_{PS}$ to obtain a value which can be compared to the other of $v_D$ and $v_{PS}$ to determine the extent to which the production part deviates from a perfect part. In one embodiment, the apparatus adds the difference between $v_{RL}$ and $v_{RS}$ to $v_D$ to obtain a given value which is compared to $v_{PS}$ to determine the extent to which the production part deviates from a perfect part. Alternatively, the apparatus is programmed to add the difference between $v_{RL}$ and $v_{RS}$ to $v_{PS}$ to obtain a given value which is compared to $v_D$ to determine the extent to which the production part deviates from a perfect part.

The inspection apparatus may be part of a combination which also includes a production part and a reference part, wherein the production part has substantially a same size and shape as the reference part. The second measuring means has means for supporting the production part and the reference part at substantially a same location.

The invention is also a method of inspecting parts to determine deviations between locations of (a) data points actually inspected on a production part and (b) corresponding nominal data points specified for a perfect part. This method includes the following steps:
- a first measuring apparatus is used at a first site to inspect a reference part to obtain a first reference data set which contains coordinate values of data points on the reference part;
- the coordinate values of the first reference data set are compared to coordinate values of a nominal data set which contains coordinate values of the nominal data points to obtain a first set of deviations which are the differences between the coordinate values of nominal data points and the coordinate values of corresponding data points on the reference part perceived by the first measuring apparatus at the first site;
- a second measuring apparatus is used at a second site, where temperature fluctuations are greater than at the first site, to reinspect the reference part to obtain a second reference data set which contains coordinate values of the data points on the reference part as perceived by the second measuring apparatus at the second site;
- the second reference data set is combined with the first set of deviations to obtain a target data set which contains coordinate values of data points on a perfect part as they would be perceived by the second measuring apparatus at the second site;
- the second measuring apparatus at the second site is used to inspect corresponding data points on a production part to obtain a production part data set which contains coordinate values of data points on the production part actually perceived by the second measuring apparatus at the second site; and,
- the production part data set is compared to the target data set to determine deviations between the coordinate values of (a) the data points of the production part as perceived at the second site by the second measuring apparatus, and (b) the data points of a perfect part as perceived at the second site by the second measuring apparatus.

Preferably the first site is a measuring laboratory and the second site is a manufacturing shop; various values are measured along one two or three axes in an orthogonal coordinate axis system; and, one or both of the measuring apparatuses has a workpiece-contacting probe. The reference part and the production part have substantially the same size and shape, and a plurality of production parts are inspected.

BRIEF DESCRIPTION OF THE DRAWINGS

FIG. 1A is a perspective view of a sheet of drawings which illustrate a part which is perfect in the respect that it is precisely identical to specifications.

FIG. 1B is an isometric view of a reference part which corresponds substantially in size and shape to the perfect part.

FIG. 1C shows one of many production parts which are manufactured in the shop and which have substantially the same size and shape as the parts illustrated in FIGS. 1A and 1B.

FIG. 2 is an isometric view a laboratory machine which is used to inspect the reference part shown in FIG. 1B.

FIG. 3 shows a shop machine which is used to inspect the reference part of FIG. 1B and a plurality of production parts such as the one shown in FIG. 1C.

DETAILED DESCRIPTION

Theoretical Background

Three major sources of errors in coordinate measuring machines are (a) temperature changes in the parts being measured, (b) temperature changes in the measuring instrument itself, and (c) peculiarities inherent in any given machine due to nonlinearity of guide rails, inaccuracies in readout scales, and various distortions of the machine's components.

The theoretical underpinnings of the invention are the following principles:
- When the temperature of a measuring instrument changes, the values of measurements from the instrument also change; but, at any given temperature, the measurements from the instrument are repeatable within an acceptable range of accuracy;
- Within the measurement volume of a measuring instrument at a given temperature, the machine errors vary from one point to another;
- These errors are consistent and repeatable for any given point within the measuring volume at a given temperature;
- The size and shape of a part ("artifact") change in response to temperature changes; however, at any given temperature, the size and shape of the part are consistent.

In this specification, the reference "DP" is used to identify data points; "DS" is used to identify data sets which contain either (1) position-indicating coordinates for many data points, or (2) deviation values Δ; and, "v" is used to represent, in a generic sense, position-indicating values along the x, y and z axes. As to the various subscript characters:
- "D" indicates that the drawings 2 is the source of the data;
- "R" indicates that the reference part E is the source of the data;

- "P" indicates that the production part E is the source of the data;
- "L" indicates that the involved data is as perceived actually or theoretically by a measuring machine in the laboratory; and,
- "S" indicates that the involved data is as perceived actually or theoretically by a measuring machine in the shop.

It should be understood that there are three versions of the part. They are shown in FIGS. 1A, 1B and 1C. All have approximately the same size and shape. The shape is an unconventional geometric shape in the respect that it is not a sphere, cylindrical prism, rectangular prism, annulus or ellipsoid. One is a perfect part D which exists on and is specified by the part drawings 2 shown in FIG. 1A. Another is a reference part E shown in FIG. 1B, and the third is a production part E shown in FIG. 1C. Numerous such production parts will normally be manufactured and measured on the shop floor. The reference part R does not require higher tolerances than the production parts so, in this respect, its function is entirely different from that of a near-perfect part or a gauge block.

These parts D, R, and P have corresponding corners $DP_O$ which in this example are arbitrarily selected as benchmarks or data points where the coordinate values of x, y, and z are zero. The parts E and E are inspected by the measuring machines shown in FIGS. 2 and 3. Both of these machines take readings at many data points $DP_1$, $DP_2$, $DP_3$, ... $DP_n$ which substantially correspond from part-to-part. According to the drawings 2, the corner $DP_D$ of the perfect part is at a data point where x has a value of 60, y has a value of 50, and z has a value of 30. The corresponding point is located at $DP_R$ on the reference part and at $DP_P$ on the production part.

FIG. 2 shows a coordinate measuring machine 3 which is used to inspect the reference part R in a controlled laboratory environment. This machine has a horizontal surface 4 which supports the reference part R, and a probe 5 provided with a stylus tip 6 for contacting the surface of a workpiece at any point. The probe may be a hard probe, a touch trigger probe, or an analog probe. These types of probes are well known in the art, and examples of them are shown respectively by U.S. Pat. Nos. 3,840,993, 4,153,998, and 5,154,002.

The probe 5 is supported for movement along three mutually perpendicular linear axes. The probe support includes a carriage 7 which travels along a horizontal beam 8 for x-axis movement. The beam is part of a bridge 9 which is supported and guided for y-axis movement. An upright column 10 is movable vertically on the carriage 7 in order to provide the probe with z-axis mobility. The probe is connected to a mount on the lower end of the column 10. The x, y and z movements may be produced manually, or they may be motor driven and computer programmed in order to move along the surface of the workpiece.

The laboratory machine 3 has scales 11x, 11y and 11z which are readable visually, optically, inductively, magnetically or otherwise to provide position-indicating signals. A computer 12 receives, processes and stores data read from the scales. Readout devices such as printers and numeric displays are also provided.

On the shop floor there is another bridge type coordinate measuring machine 3' which is used to inspect the reference part E and production parts P. This machine 3' can be the same as or different from the laboratory machine 3. It has a support surface 4' a carriage 7' which travels on the beam 8' of a traveling bridge 9'. A vertical column 10' carries a probe 5' provided with a stylus tip 6'. This machine has a computer 12' which is configured so it can share data with the computer 12 via a network or by physical transfer of recording media. It is also possible to have a single computer console which performs the tasks of the two computers 12 and 12'.

According to the present invention, the reference part R is first inspected by the laboratory machine 3. The part is positioned on the support surface 4 and the probe 5 is moved so that the stylus tip 6 contacts multiple data points on the surface of the part. The locations of these data points are processed and recorded in order to provide a numerical "picture" of the configuration of the part.

When the probe tip 6 is in contact with the reference part at the data point $DP_R$ it provides values $x_{RL}$, $y_{RL}$ and $z_{RL}$ which respectively quantify the x, y and z coordinates of the location of the data point $DP_R$. A wildcard term $v_{RL}$ is used in this specification to describe any one of the values $x_{RL}$, $y_{RL}$ and $z_{RL}$. As is well known in the art, corrections are introduced to account for the position and diameter of the stylus tip.

The reference part is then removed from the laboratory and taken to a second site such as the shop shown in FIG. 3 where the temperature and other environmental conditions fluctuate more than in the laboratory.

After the reference part has been in the shop for a period of time sufficient to become acclimated to the environmental conditions there, it is inspected by the shop machine 3' to get a second set of data which contain another "picture" of the reference part in the form of coordinate values $v_{RS}$ of data points on the reference part actually perceived by the second measuring apparatus 3'. These data are processed and stored in the computer 12'.

Since the errors attributable to a particular machine will vary from point-to-point within the measuring volume, the reference part and the production parts should be put at a substantially uniform location on the shop machine so that values from the machine will have the same errors when inspecting the reference part as when inspecting the production parts. Likewise, it is desirable for the reference part and the production parts to have substantially the same size and shape, and for the measurements to be taken at data points which are substantially the same on all parts. Otherwise, the shop machine would be taking measurements at different points within its measurement volume, and these different points may have different errors to skew the results.

The invention may be practiced in many ways, two examples of which are presented here.

EXAMPLE 1

According to this example, a reference part data set (obtained by inspecting the reference part in the laboratory) is compared to a perfect data set (obtained from the drawings of a perfect part). This comparison is used to generate a data set made up of deviation values $\Delta P$ which provide comparisons between the perfect part and the reference part. The reference part is inspected in the shop to get a set of values to which the values $\Delta P$ are added. This yields target values which are what the shop machine would "see" if it inspected a perfect part. A production part is then measured in the shop to obtain a data set which can then be compared to the target data set to determine if the production part is within tolerances. The steps of this procedure and exemplary coordinate values for one data point are shown in the following Table I.

The production part E is then placed at substantially the same location and orientation on the shop machine 3' as had been occupied by the reference part R when it

TABLE I

| ROW | | DATA SOURCE | DATA SET NAME | ONE SELECTED POINT | VALUE SYMBOL (for x, y, z) | COORDINATE VALUES (SELECTED POINT) | | |
|---|---|---|---|---|---|---|---|---|
| | | | | | | x | y | z |
| 1 | Take specified values from drawings (a "perfect part") | Drawings | $DS_D$ | $DP_D$ | $v_D$ | 60 | 50 | 70 |
| 2 | Inspect the reference part, using the lab machine | Lab machine | $DS_{RL}$ | $DP_R$ | $v_{RL}$ | 58 | 52 | 69 |
| 3 | Calculate part-to-part deviations between perfect part as specified in the drawings, and reference part as "seen" by the lab machine (Row 1 minus Row 2) | Computer | $DS_\Delta$ | | | +02 | −02 | +01 |
| 4 | Transport the part to the shop, where temperatures fluctuate more than in the lab | | | | | | | |
| 5 | Inspect reference part using shop machine | Shop Machine | $DS_{RS}$ | $DP_R$ | $v_{RS}$ | 60 | 51 | 71 |
| 6 | Calculate "target" values which the shop machine would perceive when inspecting a perfect part (Row 3 plus Row 5) | Computer | $DS_T$ | $DP_T$ | $v_T$ | 62 | 49 | 72 |
| 7 | Inspect a production part, using the shop machine | Shop Machine | $DS_{PS}$ | $DP_P$ | $v_{PS}$ | 61 | 48 | 68 |
| 8 | Compare values for a production part with target values associated with a perfect part (Row 7 minus Row 6) | Computer | $DS_{P-T}$ | | $v_{P-T}$ | −01 | −01 | −04 |

As stated in Row 2 of Table I, the reference part R is inspected in the laboratory to get a reference data set $DS_{RL}$ which includes coordinate values for many data points on the reference part. The columns x, y, and z contain the values $v_{RL}$ perceived by the laboratory machine for data point $DP_R$ on the reference part R. These values are compared with the specified coordinate values in data set $DS_D$ based on the perfect part as drawn to obtain a set of deviations $DS_\Delta$. These deviations represent, for each of the three axes, the differences between the location of point $DP_D$ on a perfect part and the laboratory-measured location of the corresponding data point $DP_R$ on the reference part.

The reference part E is then taken from the laboratory to the shop where temperature fluctuations are greater than those in the laboratory. After the reference part R has been in the shop for a period of time sufficient to become acclimated to shop temperatures, it is measured by the shop machine in the shop's environmental conditions to provide a data set $DS_{RS}$ which includes coordinate values for many data points including the values $v_{RS}$ for data point $DP_R$, i.e. the values of x, y and z which are shown in Row 5 of this table.

With the known data sets $DS_{RL}$ and $DS_{RS}$ which represent the reference part as seen by the two machines 3 and 3' it is then possible, as will be explained below, to calculate what values would be indicated by the shop machine if it were to inspect the perfect part.

According to Row 6, the part-to-part deviation values $\Delta P$ (which compare a perfect part to the reference part) are added to the values $v_{RS}$ obtained when inspecting the reference part in the shop. The sums indicate the values $v_T$ which the shop machine would obtain if it were to inspect the perfect part. These are referred to herein as "target values."

was being inspected. The production part is inspected to produce a data set $DS_{PS}$ which includes the x, y, and z values for the point $DP_P$ as shown in Row 7. This is compared with the data in Row 6 to determine the extent to which the location of the point $DP_i$, on the production part deviates from the location of the corresponding point $DP_D$ on a perfect part.

From another perspective, it will be seen that the values ($v_{RL}$) obtained when inspecting the reference part in the laboratory are subtracted in Row 2, and the values ($v_{RS}$) obtained when inspecting the reference part in the shop are added in Row 5. The effect of this is that the differences ($v_{RL}$-$v_{RS}$) between these values are added to the perfect part values ($v_D$ in Row 1) to obtain values ($v_T$, the target values in Row 6) which can be compared to the values obtained when the production part is inspected in the shop. This latter comparison will indicate how far the production part deviates from a perfect part, and whether or not the production part is within allowed tolerances.

EXAMPLE 2

In this example, a data set (obtained by inspecting the reference part in the laboratory) is compared to a data set (obtained by inspecting the reference part in the shop) to obtain a set of values $\Delta M$ which represent machine-to-machine deviations. Adding these deviation values to a data set obtained by inspecting a production part in the shop produces a set of data which represent what the laboratory machine would "see" if it inspected the production part. These data can then be compared to dimensions specified in the drawings 2 to determine if the production part is within tolerances. Table II on the following page illustrates this technique.

TABLE II

| ROW | | DATA SOURCE | DATA SET NAME | ONE SELECTED POINT | VALUE SYMBOL (for x, y, z) | COORDINATE VALUES (SELECTED POINT) | | |
|---|---|---|---|---|---|---|---|---|
| | | | | | | x | y | z |
| 1 | Inspect the reference part, using the lab machine | Lab Machine | $DS_{RL}$ | $DP_R$ | $v_{RL}$ | 58 | 52 | 69 |
| 2 | Transport the part to the shop, where | | | | | | | |

TABLE II-continued

| ROW | | DATA SOURCE | DATA SET NAME | ONE SELECTED POINT | VALUE SYMBOL (for x, y, z) | COORDINATE VALUES (SELECTED POINT) | | |
|---|---|---|---|---|---|---|---|---|
| | | | | | | x | y | z |
| | temperatures fluctuate more than in the lab | | | | | | | |
| 3 | Inspect the reference part, using the shop machine. | Shop Machine | $DS_{RS}$ | $DP_R$ | $v_{RS}$ | 60 | 51 | 71 |
| 4 | Calculate machine-to-machine deviations $\Delta M$ (Row 1 minus Row 3) | Computer | $DS_{\Delta M}$ | | | −02 | −01 | −02 |
| 5 | Inspect production part, using the shop machine | Shop Machine | $DS_{PS}$ | $DP_P$ | $v_{PS}$ | 61 | 48 | 68 |
| 6 | Calculate values which the lab machine would perceive for the production part (Row 4 plus Row 5) | Computer | $DS_{PL}$ | | $v_{PL}$ | 59 | 49 | 66 |
| 7 | Take specified values from drawings (a "perfect part") | Drawings | $DS_D$ | $DP_D$ | $v_D$ | 60 | 50 | 70 |
| 8 | Compare "perfect part" values per drawings with values for the production part (as perceived by lab machine). (Row 6 minus Row 7) | Computer | $DS_{P-D}$ | | | −01 | −01 | −04 |

Referring to Table II, it will be seen that this procedure commences with the inspection of the reference part R in the laboratory to get a set $DS_m$ of values $v_{RL}$ which are the coordinate values for many data points on the reference part E, including the point $DP_R$ for which the coordinate values are shown in Row 1 (columns x, y, and z). Then, the reference part is taken to the shop floor where temperature fluctuations are greater than in the laboratory. The reference part is given sufficient time to adjust to the temperatures on the shop floor, and it is inspected by the shop machine to get a data set $DS_{RS}$ which includes coordinate values $v_{RS}$ of many points including those for the data point $DP_R$. The latter are shown in columns x, y and z of Row 3. The respective coordinate values in sets $DS_{RL}$ and $DS_{RS}$ are compared to get a set of deviation values $\Delta M$ which represent the deviations from machine-to-machine (comparing the laboratory machine to the shop machine). Such values for the point $DP_R$ on the reference part R are shown in Row 4.

As indicated in Row 5 of this table, a production part P is then measured by the shop machine to get a set $DS_{PS}$ of data including values $v_{PS}$ which are the location-indicating coordinates of the data point $DP_P$. The deviations $\Delta M$ from Row 4 are added to the values $v_{PS}$ to obtain a set $DS_{PL}$ of values $v_{PL}$ which establish where the laboratory machine would have "seen" the data point $DP_P$. These values in set $DS_{PL}$ are compared with the specified values $v_D$ (in Row 7) for the location of data point $DP_D$ to find out the extent to which the point $DP_P$ on the production part deviates from the specifications established for the corresponding data point $DP_D$ on the perfect part. The results of this comparison are shown in Row 8. They correspond to and verify those obtained using the procedure of Example 1.

From the foregoing, it will be seen that the effect of this procedure is to add $\Delta$ (the difference between the values obtained when inspecting the production part in the lab and in the shop) to the values ($v_{RS}$) obtained when inspecting the production part in the shop to obtain a value ($v_{PL}$). This value is then compared to the corresponding perfect part value ($v_D$) to determine the extent to which the production part deviates from a perfect part.

OBSERVATIONS AND COMMENTS

In cases where extreme accuracy is necessary, or where there are significant temperature fluctuations on the shop floor, the reference part may be reinspected periodically to update the data to provide more accurate values to reflect the current conditions. It is possible to reinspect a reference part prior to each inspection of a production part. Such a procedure is facilitated by the arrangement shown in FIG. 3 where a shuttle table 13 has two jigs which support the reference part E and the production parts P. With this arrangement, the reference part is inspected, a first production part is inspected, the reference part is reinspected, a second production part is inspected, etc, etc. The data is continually updated at each reinspection of the reference part.

The invention may be practiced with different types of probes including hard probes, non-contact probes, touch trigger probes, and analog probes. It is most effective to use an analog probe. In an analog probe, the stylus tip is relatively movable with respect to the probe mount, and there are devices for sensing the extent and direction of the relative movement between the tip and mount.

Analog probes are particularly well suited to this task because they are able to collect large amounts of data in a short time. Data is storable as "deviation curves" related to the place on the element or feature where they occur. For example, an analog probe can measure an arbitrary circle using 500 data points in about the same length of time it would take a touch trigger probe to touch the circle at five points. Due to the availability of data from a larger number of data points, values obtained from an analog probe are less vulnerable to environmental conditions such as vibrations. If a significant vibration occurs at the instant a touch trigger probe is activated, there are no adjacent measurements to show by comparison that the reading was an aberration. However, when there are many additional readings as are available from an analog probe, the aberration is easily noticed by comparison with the adjacent readings.

Because the invention provides highly accurate measurement values in the vicinity of machine tools which are manufacturing parts in the shop, the invention lends itself to a feedback system in which the computer sends signals to the machine tools, indicating the magnitude of errors soon after parts are manufactured. These signals can be processed quickly to change the operation of the machine tools to minimize errors in future parts.

Only two embodiments of the invention have been described in detail, but persons familiar with the art will recognize that the invention may be practiced using a wide variety of procedures and machines. Therefore, it is emphasized that the invention is not limited only to the embodiments described above but is embracing of other systems which fall within the spirit of the following claims.

I claim:

1. A method for determining the difference between a measured value $v_{PS}$ of a location of an actual data point on a production part and a nominal value $v_D$ of a desired location of said data point on a perfect part, said method utilizing a reference part, said method including the following steps:

using a first measuring apparatus at a first site to obtain a value $v_{RL}$ of the location of an actual data point on the reference part, using a second measuring apparatus located at a second site where temperature fluctuations are greater than at said first site to obtain a second value $v_{RS}$ of the location of the actual data point on the reference part, using the second measuring apparatus at the second site to measure the production part at a data point which corresponds to the actual data point on the reference part to obtain a value $v_{PS}$ of the location of the actual data point on the production part, adding the difference between $v_{RL}$ and $v_{RS}$ to one of $v_D$ and $v_{PS}$ to obtain a given value, and comparing the given value to the other of $v_D$ and $v_{PS}$ to determine the extent to which the production part deviates from a perfect part.

2. A method according to claim 1 wherein the difference between $v_{RL}$ and $v_{RS}$ is added to $v_D$ to obtain a given value, and comparing the given value to $v_{PS}$ to determine the extent to which the production part deviates from a perfect part.

3. A method according to claim 1 wherein the difference between $v_{RL}$ and $v_{RS}$ is added to $v_{PS}$ to obtain a given value, and comparing the given value to $v_D$ to determine the extent to which the production part deviates from a perfect part.

4. A method according to claim 1 wherein said values are measured along an axis in an orthogonal coordinate axis system.

5. A method according to claim 1 wherein at least one of said measuring apparatuses has a probe provided with a member which contacts a said part on at least one of said measuring apparatuses during inspection.

6. A method according to claim 1 wherein the first site is a measuring laboratory and the second site is a manufacturing shop.

7. A method according to claim 1 wherein the reference part and the production part have substantially the same size and shape.

8. A method according to claim 1 wherein a plurality of production parts are inspected.

9. A method according to claim 1 wherein said values are obtained from both of the first and second apparatuses by using analog probes which each include a probe mount, a stylus tip which is relatively movable with respect to the probe mount, and devices for sensing the extent and direction of the relative movement between the stylus tip and the probe mount.

10. A method of inspecting parts to determine deviations between locations of (a) data points actually inspected on a production part and (b) corresponding nominal data points specified for a perfect part, said method including the following steps:

using a first measuring apparatus at a first site to inspect a reference part to obtain a first reference data set which contains coordinate values of data points on the reference part as perceived by said first measuring apparatus;

comparing said coordinate values of said first reference data set to coordinate values of a nominal data set which contains coordinate values of said nominal data points to obtain a first set of deviations which are the differences between the coordinate values of nominal data points and the coordinate values of corresponding data points on said reference part perceived by said first measuring apparatus at said first site;

using a second measuring apparatus at a second site, where temperature fluctuations are greater than at the first site, to reinspect the reference part to obtain a second reference data set which contains coordinate values of said data points on the reference part as perceived by the second measuring apparatus at the second site;

combining the second reference data set with the first set of deviations to obtain a target data set which contains coordinate values of data points on a perfect part as they would be perceived by the second measuring apparatus at the second site;

using said second measuring apparatus at the second site to inspect corresponding data points on a production part to obtain a production part data set which contains coordinate values of data points on the production part actually perceived by the second measuring apparatus at the second site, and comparing the production part data set to the target data set to determine deviations between the coordinate values of (a) the data points of the production part as perceived at the second site by the second measuring apparatus, and (b) the data points of a perfect part as perceived at the second site by the second measuring apparatus.

11. A method according to claim 10 wherein said values are measured along an axis in an orthogonal coordinate axis system.

12. A method according to claim 10 wherein at least one of said measuring apparatuses has a probe provided with a member which contacts a said part on said at least one of said measuring apparatuses during inspection.

13. A method according to claim 10 wherein the first site is a measuring laboratory and the second site is a manufacturing shop.

14. A method according to claim 10 wherein the reference part and the production part have substantially the same size and shape.

15. A method according to claim 10 wherein a plurality of production parts are inspected.

16. A method according to claim 10 wherein said values are obtained from both of the first and second apparatuses by using analog probes which each include a probe mount, a stylus tip which is relatively movable with respect to the probe mount, and devices for sensing the extent and direction of the relative movement between the stylus tip and the probe mount.

17. A method of inspecting parts to determine deviations between locations of (a) data points actually inspected on a production part and (b) corresponding nominal data points specified for a perfect part, said method including the following steps:

using first measuring apparatus at a first site to inspect a reference part to obtain a first reference data set which contains coordinate values of data points on the reference part as perceived by said first measuring apparatus;

using a second measuring apparatus at a second site, where temperature fluctuations are greater than at the first site, to reinspect the reference part to obtain a second reference data set which contains coordinate values of said data points on the reference part as perceived by the second measuring apparatus at the second site;

comparing said coordinate values of said first reference data set to said coordinate values of said second data set to obtain a first set of deviation values which are the differences between the coordinate values of corresponding data points on said reference part perceived by said first and second measuring apparatuses at their respective sites;

using said second measuring apparatus at the second site to inspect corresponding data points on a production part to obtain a production part data set which contains coordinate values of data points on the production part actually perceived by the second measuring apparatus at the second site, and adding the first set of deviations to the production part data set to obtain a revised data set containing coordinate values of data points on the production part which would be perceived by the first measuring apparatus, and comparing said revised data set to coordinate values of said nominal data set to determine if the production part is within tolerances.

18. A method according to claim 17 wherein said values are measured along an axis in an orthogonal coordinate axis system.

19. A method according to claim 17 wherein at least one of said measuring apparatuses has a probe provided with a member which contacts a said part on said at least one of said measuring apparatuses during inspection.

20. A method according to claim 17 wherein the first site is a measuring laboratory and the second site is a manufacturing shop.

21. A method according to claim 17 wherein the reference part and the production part have substantially the same size and shape.

22. A method according to claim 17 wherein a plurality of production parts are inspected.

23. A method according to claim 17 wherein said values are obtained from both of the first and second apparatuses by using analog probes which each include a probe mount, a stylus tip which is relatively movable with respect to the probe mount, and devices for sensing the extent and direction of the relative movement between the stylus tip and the probe mount.

24. Inspection apparatus for determining the difference between a measured value $v_{PS}$ of a location of an actual data point on a production part and a nominal value $v_D$ of a desired location of said data point on a perfect part, comprising, a first measuring means at a first site for finding a value $v_{RL}$ expressing a location of an actual data point on the reference part, a second measuring means located at a second site where temperature fluctuations are greater than at said first site, said second measuring means being:
(a) means for determining a second value $v_{RS}$ expressing a location of the actual data point on the reference part, and
(b) means for determining a value $v_{PS}$ of the location of the actual data point on the production part; and, calculation means for adding the difference between $v_{RL}$ and $v_{RS}$ to $v_D$ obtain a value which is compared to $v_{PS}$ to determine the extent to which the production part deviates from a perfect part.

25. Inspection apparatus according to claim 24 in combination with a production part which is located on said second measuring means and a reference part which is located on said first measuring means and then on said second measuring means, said production part having substantially a same size and shape as the reference part.

26. Inspection apparatus according to claim 25 wherein the second measuring means includes support means for supporting said production part and said reference part at substantially a same location.

27. A method according to claim 24 wherein said first and second apparatuses each include an analog probe which has a probe mount, a stylus tip which is relatively movable with respect to the probe mount, and devices for sensing the extent and direction of the relative movement between the stylus tip and the probe mount.

* * * * *